May 16, 1967 R. C. SPENCER 3,319,486
STEERING WHEEL COVER ACCESSORY
Filed Oct. 23, 1965

INVENTOR.
RICHARD C. SPENCER
BY
ATTORNEY

United States Patent Office 3,319,486
Patented May 16, 1967

3,319,486
STEERING WHEEL COVER ACCESSORY
Richard C. Spencer, South Pasadena, Calif. (20253 E. San Gabriel Valley Drive, Walnut, Calif. 91789)
Filed Oct. 23, 1965, Ser. No. 503,424
4 Claims. (Cl. 74—558)

ABSTRACT OF THE DISCLOSURE

A steering wheel cover comprising an upper and a lower, thin-walled, premolded, shell-like portions adhesively bonded to the respective upper and lower surfaces of a used steering wheel. The cover portions are provided with cutouts to accommodate the steering wheel spokes and are configured to accommodate the hand grip indentations formed on the original steering wheel surface. The cover portions also have abutments on the inner and outer peripheral edges providing a gap-free covering for the original used steering wheel.

---

This invention relates to vehicle steering wheel covers and more particularly to a simple, inexpensive, easily applied cover accessory for enhancing the dress and appearance of the steering wheel.

The accessory is designed for application to the exterior surface of existing steering wheels by individual owners without need for special tools and by bonding the accurately molded parts of the invention accessory to the worn, faded and disfigured original steering wheel. The saleability and attractiveness of used motor vehicles is easily and inexpensively enhanced by improving the appearance of the steering wheel itself.

Many steering wheels become worn in use and the materials of which they are made have a tendency to collect foreign matter and to become rough, sticky and unpleasant to the touch. This condition is aggravated if the surface finish wears through unevenly exposing the underlying main body. Attempts to restore the original condition and appearance by coating the steering wheels with lacquer and other materials is difficult and expensive to carry out and provides temporary improvement at best. Other proposals involve covering the steering wheel with fabric material so woven or fabricated that it can be stretched into the assembled position on the wheel. However, such materials become embedded with soil after a short period of use and wear to an unsightly condition quickly.

The foregoing and other shortcomings of prior proposals are avoided by the present invention whereby there is provided a simple, inexpensive and easily applied thin, shell-like cover designed to have a custom fit with a particular steering wheel. The invention cover is molded from a high luster plastic material. The cover is thin-walled and shell-like throughout and conforms faithfully to the exterior contour of the steering wheel. The invention cover is made in parts arranged for assembly from the upper and lower sides of the steering wheel and with the lower parts contoured to fit around the spokes of the steering wheel and to mate faithfully with finger grip indentations or the like commonly present on many steering wheels. If desired, the continuous ring forming the upper part of the cover may be used by itself, but preferably the entire circumference of the wheel is covered by the molded parts. The parts are adhesively bonded to the wheel surface and the mating edges preferably abut one another to form a continuous gap-free cover with all exterior surfaces of the cover flush with one another along the junction area. The cover may be formed of either transparent or colored plastic either matching or contrasting pleasingly with the colored decor of the vehicle itself.

Accordingly it is a primary object of the present invention to provide a simple, inexpensive, easily-applied cover accessory for a vehicle steering wheel.

Another object of the invention is the provision of a thin shell-like cover for a vehicle steering wheel having a high-luster highly-polished surface and dyed with any suitable color either matching or contrasting with the vehicle color scheme.

Another object of the invention is the provision of a vehicle steering wheel cover made of hard thin-walled highly polished material to which dirt and grime does not readily adhere and which is readily cleaned at intervals.

These and other more specific objects will appear upon reading the following specification and claims and upon considering in connection therewith the attached drawing to which they relate.

Referring now to the drawing in which a preferred embodiment of the invention is illustrated:

Figure 1:
FIGURE 1 is a cross-sectional view through one of the ring-like cover parts.
Figure 2:
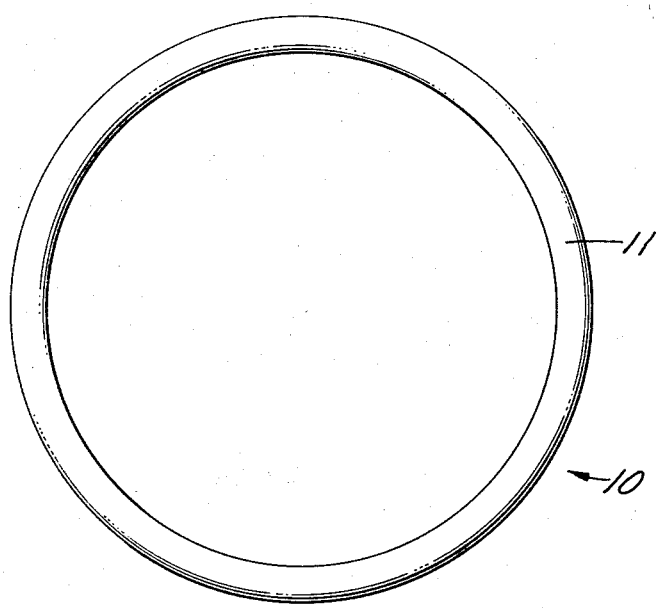
FIGURE 2 is a top-plan view of the cover part applied to the top side of a steering wheel.
Figure 3:
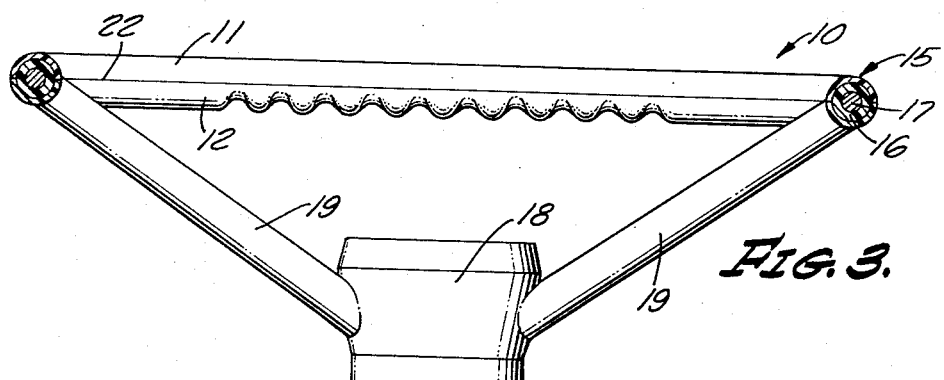
FIGURE 3 is a cross-sectional view through a steering wheel showing the invention cover in the assembled position thereon.
Figure 4:
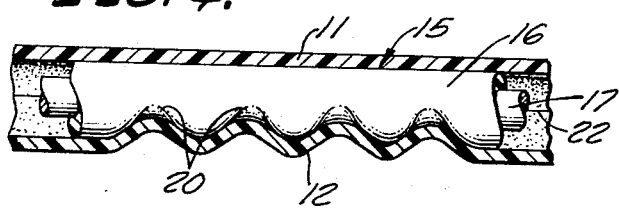
FIGURE 4 is a fragmentary view partly in section showing the portion of the invention cover along the handgrip portion of the steering wheel.

Referring to the drawing there is shown a preferred embodiment of the invention cover accessory designated generally 10 and formed in a plurality of thin-walled shell-like parts 11, 12. These parts are shown as assembled snugly about and concealing the steering wheel rim proper 15. This wheel usually comprises an outer covering 16 and a metal core 17 connected to steering wheel post 18, as by spokes 19.

It is common practice for the steering wheel to have its under rim molded with finger grip indentations 20. In this event, it is most desirable that the parts of the cover made for assembly against the underside of the steering wheel be correspondingly shaped so as to mate snugly with these finger grips. This is easily accomplished by using a mold shaped in conformity with the contour of the steering wheel.

Parts 11 and 12 are preferably molded from a suitable plastic composition of which many are available on the market and having the desirable properties now to be outlined. The composition should have a high durometer to provide a very hard finish and to take a highly polished finish as it is molded in a suitable mold. The exterior appearance should provide a high luster and a pleasing color, except when using plastic transparent material. Usually a transparent material is not desirable because disclosing the unsightly appearance of the wheel sought to be concealed. However, a transparent main body may be employed in the case where the dye is applied to the inner surface of the cover or in a case where particles of light reflecting material are embedded in the plastic to provide an interesting pattern and a pleasing appearance.

The parts are preferably molded with their juxtaposed edges positioned to abut one another when properly assembled against the surface of the wheel. Desirably no gaps should exist and if any are present these can be filled with bonding material.

The application of the cover to the wheel for which it is designed is accomplished by coating the surface of the wheel with a suitable epoxy or other bonding agent. Before the coating operation it is desirable to roughen the surface of the old wheel and to remove any grease or collections of foreign matter. The interior surfaces of the cover part are preferably made rough in the molding operation as this provides a stronger bond with the wheel. Usually the upper cover 11 is applied to the top of the wheel first following which the lower part 12 is pressed upwardly until its edges mate with the edges of the upper half. The lower cover parts may be made in one or more parts depending upon the design of the steering wheel and the nature of the junction of the spokes with the wheel. No skill, tools or prior experience is required and any novice following simple instructions can apply the invention cover to his own vehicle. After the parts are firmly pressed in position it is desirable to wrap cording tightly about the cover parts to hold them firmly in place until the adhesive takes a set. Any excessive exuding of bonding material from between mating edges 22 is cleared away and the wheel left until the adhesive sets.

While the particular steering wheel cover accessory herein shown and disclosed in detail is fully capable of attaining the objects and providing the advantages hereinbefore stated, it is to be understood that it is merely illustrative of the present preferred embodiment of the invention and that no limitations are intended to the details of construction or design herein shown other than as defined in the appended claims.

I claim:

1. A decorative dress cover accessory for assembly to a vehicle steering wheel to enhance its appearance and adapted to be easily applied by the novice, said cover accessory comprising a pre-molded one piece thin-walled shell-like ring of arcuate configuration in cross-section and sized to fit directly against the upwardly facing side of a used vehicle steering wheel, said ring being formed of a high durometer plastic having a high-sheen smooth glossy outer surface free of protrusions and irregularities, and the interior surface being non-glossy and adapted to be adhesively bonded to the upwardly facing side of a used steering wheel.

2. An accessory steering wheel cover as defined in claim 1 characterized in that said cover comprises a pair of thin-walled rings of arcuate shape in cross section and sized to cooperate mutually to enclose both the upper and lower surfaces of a used steering wheel with at least one of said rings having cutouts accommodating the spokes conventionally used to attach the wheel to the steering post.

3. An accessory steering wheel cover as defined in claim 2 characterized in that one of said rings is contoured to conform with handgrip indentations formed along the underside of a conventional steering wheel, and said one ring has corresponding fingergrip indentations in its exterior surface.

4. A steering wheel dress cover for enhancing the appearance and serviceability of a used vehicle steering wheel, said cover being formed in a plurality of thin-walled parts conforming in shape with a used steering surface contour of the portion of the wheel against which said parts are intended to be assembled, said parts being semi-circular in cross section and formed from a hard high-gloss smooth-surfaced plastic composition and cooperating to enclose the full circumference of the steering wheel when assembled thereagainst, said parts being adapted to be bonded directly to a used steering wheel surface and having cutouts to accommodate the spokes connecting the wheel to the steering wheel post, and said parts being rigid and fully supported by the steering wheel along substantially the entire inner surface thereof and having the juxtaposed edges of the parts in closely spaced relation.

References Cited by the Examiner

UNITED STATES PATENTS

| 2,972,819 | 2/1961 | Graham | 74—558 X |
| 3,227,000 | 1/1966 | Gits | 74—552 |

FOREIGN PATENTS

| 346,731 | 2/1905 | France. |
| 546,935 | 8/1942 | Great Britain. |

FRED C. MATTERN, JR., *Primary Examiner.*